May 15, 1956   G. F. CHAPPUIS ET AL   2,745,471
LOCKING AND RELEASING MECHANISM FOR TILTABLE
BACKS FOR AIRCRAFT AND SIMILAR SEATS
Filed April 30, 1952                    4 Sheets-Sheet 2

INVENTORS
George F. Chappuis
BY Carl Katan
Benj. T. Rauber
their ATTORNEY

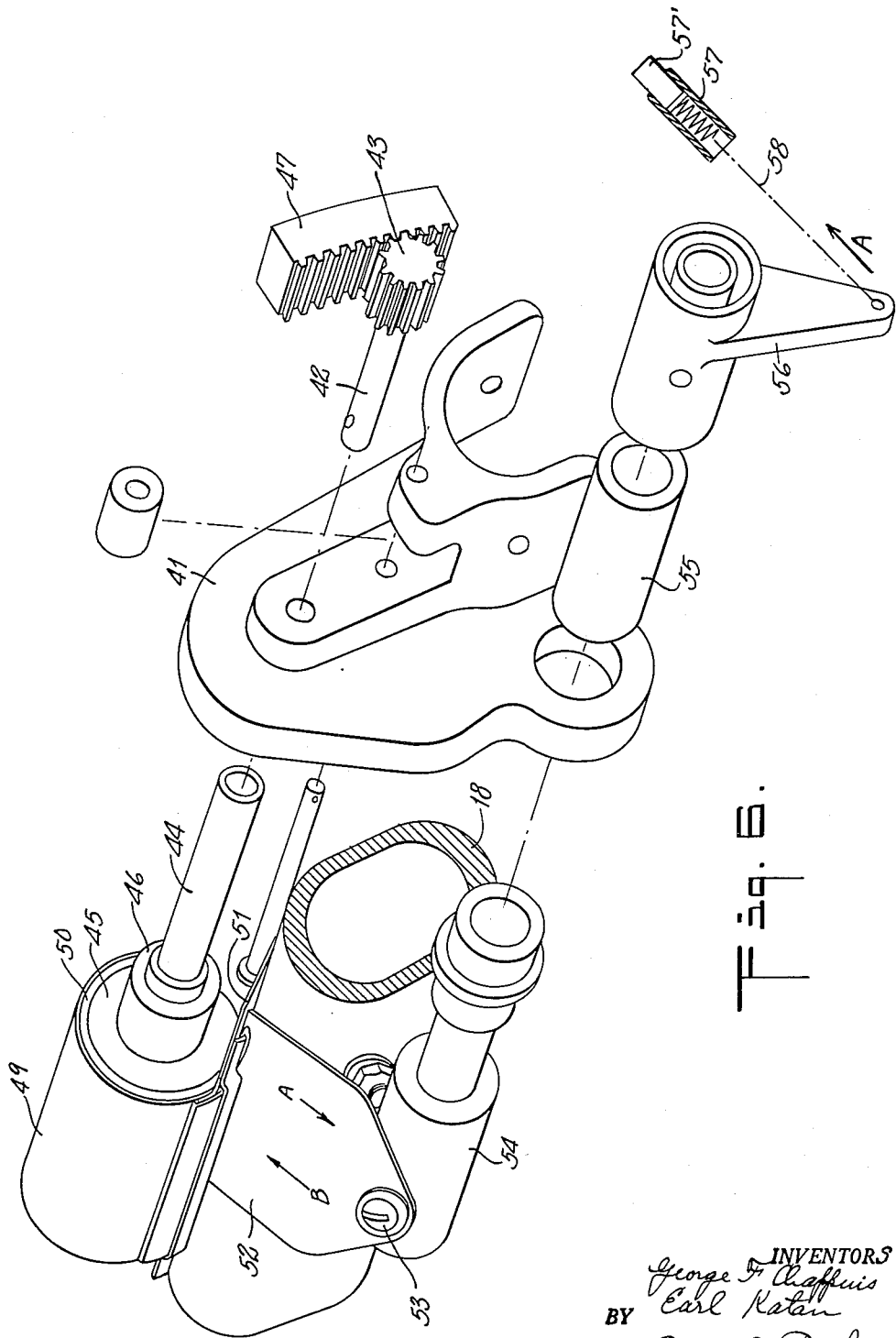

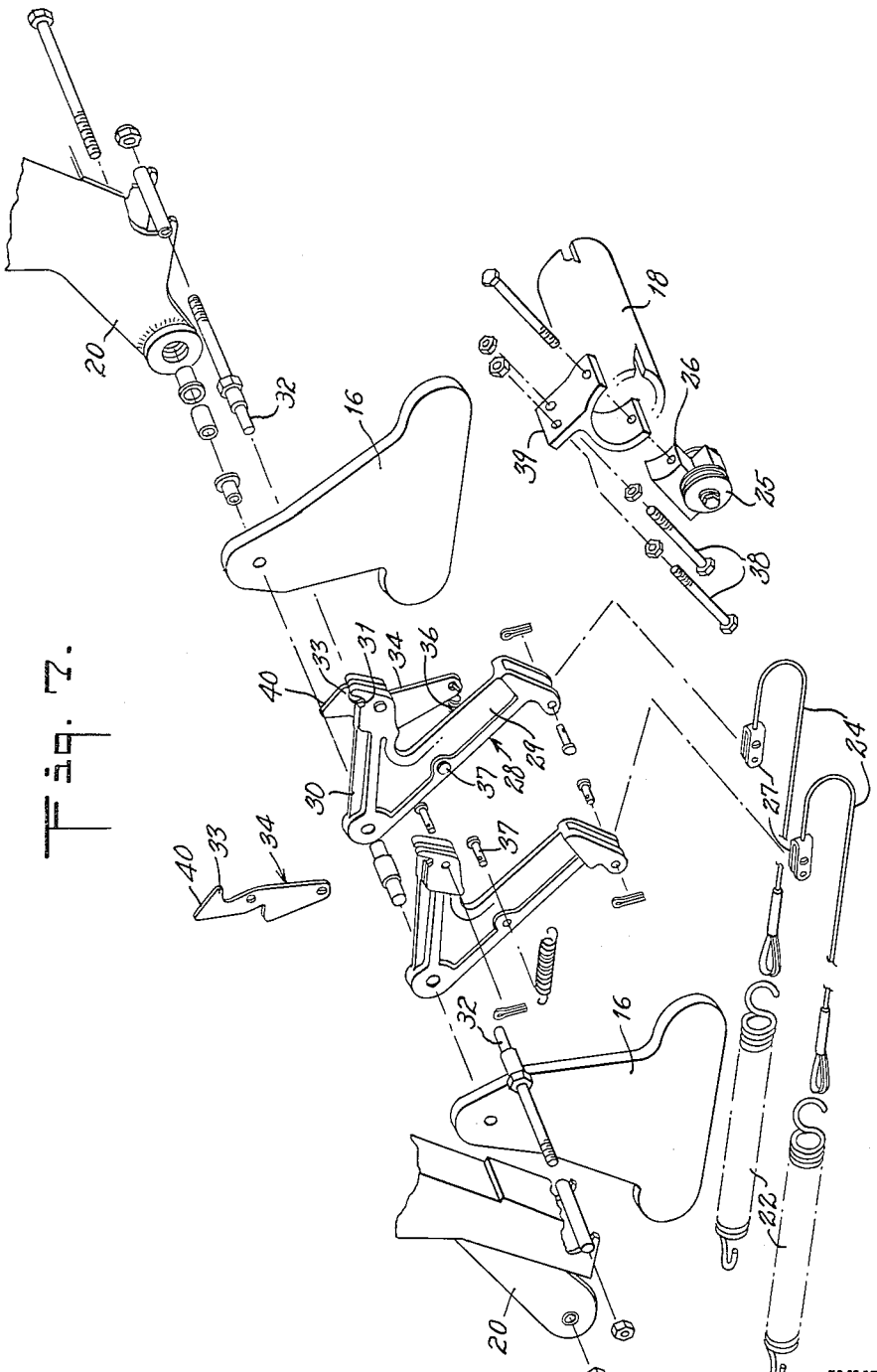

United States Patent Office 2,745,471
Patented May 15, 1956

2,745,471

LOCKING AND RELEASING MECHANISM FOR TILTABLE BACKS FOR AIRCRAFT AND SIMILAR SEATS

George F. Chappuis, Cornwall Bridge, and Earl Katan, Kent, Conn., assignors to The Aerotherm Corporation, Bantam, Conn., a corporation of Connecticut Application April 30, 1952, Serial No. 285,279

5 Claims. (Cl. 155—160)

Our present invention relates to mechanism for locking and releasing the tiltable backs of aircraft seats to meet the special requirements of aircraft and similar or comparable conveyances.

In seats for aircraft and similar conveyances it is desirable to have the backs tiltable progressively and gradually to any desired position within the limits of adjustment. The backs are normally pressed forwardly or to upright position by a spring and when free from any holding means may be tilted backwardly by pressure of the occupant acting against the spring.

It is desirable to have the seat locked positively against backward tilting from a position of adjustment except when the locking means is released by the occupant. It is desirable to have the back held from forward movement under the action of the spring but to be movable forwardly to upright position under pressure and forwardly to horizontal collapsed position in an emergency by a heavy forward blow or thrust on the back without releasing the locking or holding mechanism.

Our invention provides a mechanism whereby the above desirable features may be obtained.

In the mechanism of our invention we provide a back pivoted on a base to tilt forward and backward from upright position. The back is spring pressed to forward position. It is geared to a fixed rotatable brake drum to rotate the drum in opposite directions as the back tilts forwardly and backwardly. This gearing preferably comprises a curved rack or gear segment fixed to the back and meshing with a pinion axially fixed to the brake drum to rotate with it. A brake band is fixed at one end and extends about the brake drum in the direction of its rotation with the backward tilting of the back. The free end of the brake band is manually controlled so that it may be pushed in a direction to expand the band away from the surface of the drum or, when released, to contract the band under a light spring pressure.

The brake band is lined with a lining of flexible resilient friction material, preferably a neoprene composition, and the brake drum is preferably made of, or covered with, a phenol formaldehyde resin (Bakelite) or other material of similar physical properties.

When the manual control mechanism is released so that the free end of the brake band is moved under spring tension, the lining grips the brake drum surface lightly and yieldingly. When the seat back is tilted forwardly this light gripping action opposes any movement of the back until sufficient forward pressure is applied to cause the free end to move against the spring pressure acting on it, whereupon the back may be tilted forwardly under the light frictional drag of the drum in the brake band.

Backward tilting of the back rotates the drum in the opposite direction to bring the free end of the brake band into tighter engagement with the drum and thus lock the band and drum by a snubbing action against the fixed end. The back may accordingly be tilted forwardly under limited resistance when the locking mechanism is engaged but is locked positively against backward tilting.

When the seat back reaches approximately vertical position it engages a latch which prevents further forward tilting. The latch is engaged preferably by a projecting pin on the back structure slightly off dead center of the latch. Thus the surface of the latch at the pin slopes away toward the rear such that a normal to the pin-engagement surface of the latch at the point of engagement of the pin does not pass through the pivot of the latch but somewhat to one side of it. This engagement is sufficient to hold the back against accidental pressures or impulses encountered in normal use. In case of emergency, however, a hard blow or impact directed to the back will overcome the latch, causing it to tilt open and permit a complete forward tilting of the back to horizontal position to clear the space above the seats.

The various features of the invention are illustrated by way of example in the accompanying drawings in which:

Fig. 6 is an expanded perspective view of the locking mechanism;

Fig. 7 is an expanded perspective view of the latch mechanism.

Figure 1:
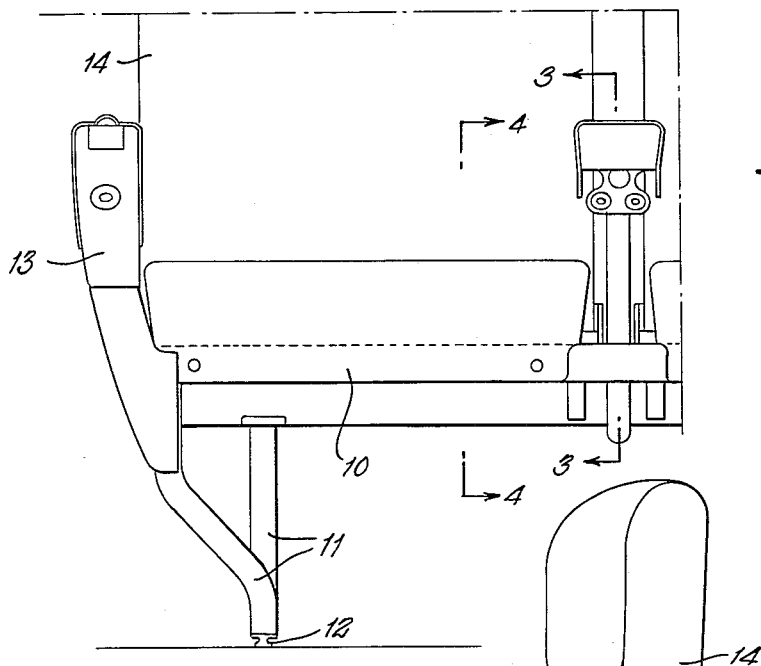
Fig. 1 is a front elevation of a seat and back embodying a preferred form of the invention.
Figure 2:
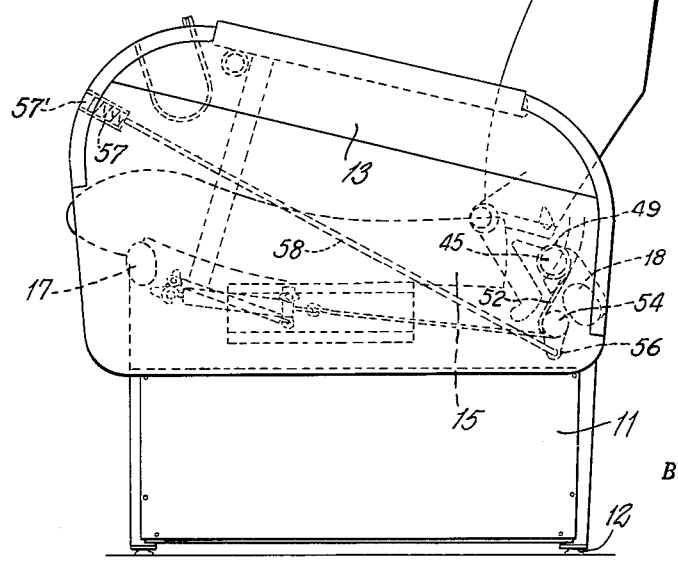
Fig. 2 is a side elevation of the seat and back shown in Fig. 1.

In the embodiment shown in the accompanying drawings, the invention is shown as applied to an aircraft seat 10 supported by legs or standards 11 on supporting rails 12. The seat is provided with arm rests 13 and a tiltable back 14 to which the invention is applied. The seat comprises a pair of side rails 15, Figs. 2 and 3, mounted on the legs or standards 11 and each has an upwardly projecting housing 16 near its rear end. The side rails 15 are joined at their front ends by a cross rail 17 which is supported on the legs 11 and at their rear ends by a cross rail 18, normally covered by a foot rest 19 for a succeeding seat. The back is provided with a downward and forward extension 20 at each side which is pivotally mounted on the corresponding housing 16 by means of pivot pins 21, Figs. 3 and 4.

The back is tilted forwardly by springs 22, one at each side of the back, each secured at its forward end to a bracket 23 depending from the forward part of its respective side rail 15 and having secured to its rear end a cable 24 which passes about a pulley 25 on a bracket 26 secured to the rear cross rail 18 and thence forwardly. The return end of each cable is provided with a shackle 27 by which it is secured to a transmission acting on the back 14.

The transmission comprises a lever 28 of bell crank form pivoted on the pivot pin 21 and having a lower arm 29, to the lower end of which the shackle 27 is secured. An upper arm 30 extends rearwardly and is provided with a notch 31 on its upper edge to receive and support a pin 32 extending sidewise from the back 14. When the back 14 is tilted backwardly the pin 32 depresses the lever arm 30 downwardly rotating the lever arm 28 and the lever arm 29 clockwise, Fig. 3, pulling the cable 24 about the pulley 25 and stretching and tensioning the spring 22. The tension of the spring 22 tends to tilt the lever 28 rearwardly and the back 14 forwardly.

When the back 14 moving forwardly reaches an upright position the pin 32 on the back engages a hook end 33 of a latch 34 pivoted at an intermediate point on a pivot pin on the seat housing 16. The latch is pressed clockwise, Fig. 3, to pin engaging position by a spring 36 secured at one end to the lower end of the latch and at its other end to a pin 37 at an intermediate point on the lower arm 29 of the lever 28. At the position of the lever 28 at which the pin 32 engages the latch 34, the arm 28 engages a stop pin 38 mounted on a bracket 39 on the back cross rail 18 thereby preventing further counter-clockwise rotation of the lever 28.

Figure 3:
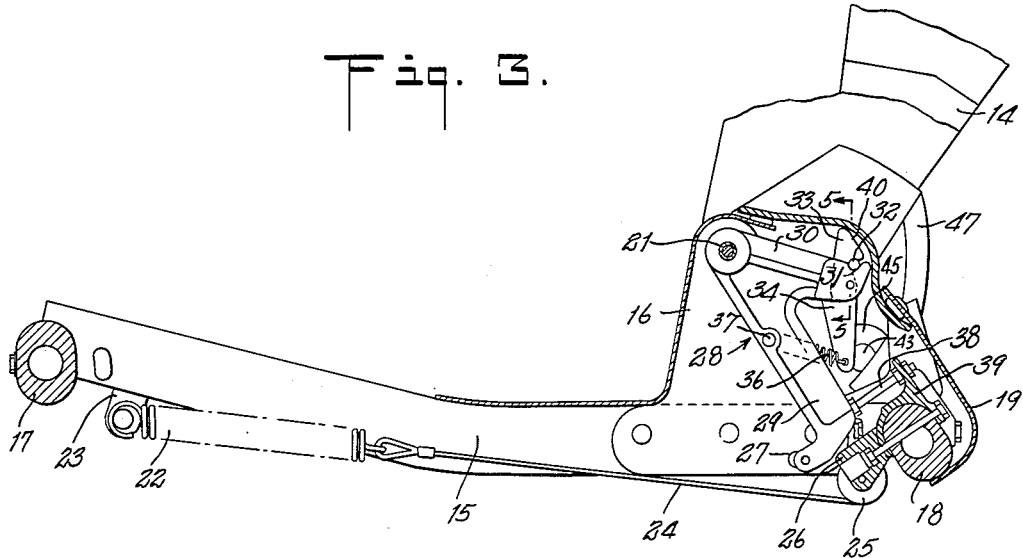
Fig. 3 is a vertical section on a larger scale taken on line 3—3 of Fig. 1.

With the lever 28 stopped from rotation counter-clockwise, as viewed in Fig. 3, the latch 34 limits the forward tilting of the back. The lower edge of the hook end 33 is however inclined slightly upwardly from the direction of upward or forward travel of the back so as to provide a component of force opposed to that of the spring 36. This component is insufficient to overcome the force of the spring under normal pressure applied to the back. The force exerted by the spring may be overcome by a sufficient force, such as a blow of a fist on the top of the seat back, which will cause the latch to swing against the tension of the spring 36 and release the pin 32 so that the back may swing forwardly to horizontal position. This enables the spaces above the seats to be cleared in case of emergency. When the back is again swung back to vertical position the pin 32 strikes an inclined upper edge 40 which forces aside the latch until the pin rests on the lever arm 30.

The brake drum for locking the back in position is mounted on a transverse shaft mounted on brackets at each end which are in turn mounted on the rear cross rail 18. One of these brackets 41 thus mounted is shown in Fig. 6, the other being a reversed duplicate. Rotatably mounted in a bearing opening in the upper part of the bracket 41 is the shaft 42 of a pinion 43, the pinion being to the right of the bracket as shown in Fig. 6. The part of the shaft 42 extending to the left of the bracket 41 enters and supports a hollow shaft 44 on which the brake drum 45 is secured by a pin or other securing means passing through the hub 46 of the drum and the shaft 42.

Figures 4, 5:
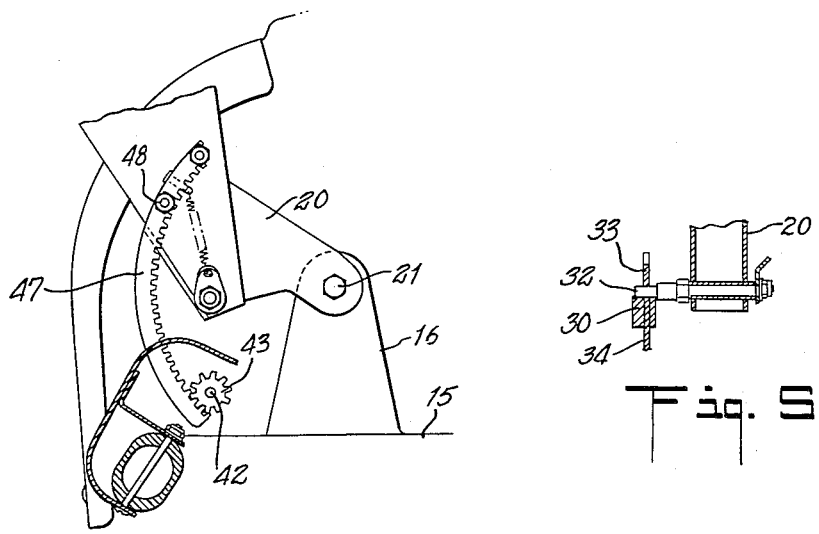
Fig. 4 is a vertical section taken on line 4—4 of Fig. 1.
Fig. 5 is a detail section of a part of the latch taken on line 5—5 of Fig. 3.

The pinion 43, and with it the drum 45, are driven in one direction or the reverse by an arcuate rack or gear segment 47, Figs. 3 and 4, secured to the lower part of the back by a bolt 48 or other securing means as indicated in Fig. 4. The rack 47 is of circular curvature centered on the pivot pin 21 and meshes with the pinion 43 in all normal positions of the back. In the particular arrangement and positions shown in Figs. 3 and 6 the pinion 43 rotates clockwise when the back is lowered or tilted backwardly and counter-clockwise when the back is tilted forwardly. As the back tilts forwardly to vertical position and the pin 32 engages the latch 34 the end of the rack 47 reaches the pinion 43. Upon release of the latch and tilting of the back forwardly beyond vertical position, the end of the rack passes out of mesh with the pinion.

A brake band 49 having a neoprene or similar lining 50 is secured at one end to a bracket 51 on the cross rail 18, as shown in Fig. 6, and extends clockwise around the cylindrical surface of the drum 45 and through a slot in the bracket 51. At its opposite or free end 52 the brake band 49 is secured by a bolt 53 to a drum 54 on a rock shaft 55 journalled in and projecting through an opening in the bracket 41.

The rock shaft may be rotated through a small angle in one direction or the reverse by a crank arm 56 which is normally held in the direction of the arrow A, Fig. 6, by a spring mounted on the frame of the seat indicated diagrammatically as 57, and transmission such as a link, cord or chain indicated diagrammatically at 58, to draw the brake band and lining into a light frictional engagement with the drum 45. The shaft 55 is rotated in one direction by the spring 57 and in the opposite direction by suitable manually operated means, not shown.

If the drum is rotated clockwise, Fig. 6, this frictional engagement instantly draws the band and its lining more tightly onto the drum and locks it positively to the bracket 51. In this way the back is positively and securely locked against backward tilting in whatever angle of inclination it may be.

Upon forward tilting of the back and consequent counter-clockwise rotation of the drum 45, the frictional engagement of the band on the drum draws the band in the direction of the arrow B. But as the shaft 55 may rock against the tension of spring 57 the rotation of the brake drum counter-clockwise as the back is tilted forwardly tends to expand the brake drum and release it. Accordingly the back is held against the action of the spring 22 but may be pushed or tilted forwardly with the application of moderate pressure until the pin 32 engages the latch 34. The spring 57 may be compressed by a push button 57' or equivalent device and the shaft 55 rotated to release the brake band from the drum whereupon the back may be adjusted to any position. Upon releasing the spring the back is automatically locked in its adjusted position.

Having described our invention, what we claim is:

1. A seat having a back tiltable forwardly and backwardly from upright position, an arcuate rack mounted on said back and centered on the pivotal point of said back, a pinion meshing with said rack, a brake drum driven by said pinion, a brake band having one end secured in fixed position and extending from said fixed position about said drum in the direction of rotation of said drum when said back is tilted forwardly, said brake band extending to a free end, a friction lining of flexible resilient material on the surface of said brake band facing said drum, a spring means resiliently drawing said free end to tighten said brake band on said drum and releasable to space said friction lining from said brake drum, a latch to engage said back when said back is moved to upright position, said latch being pivoted slightly off dead center to the point of engagement of said back to yield upon an overriding pressure applied to said back, said rack passing out of engagement with said pinion as said back tilts forwardly beyond upright position.

2. The seat of claim 1 in which said lining is a neoprene composition and in which said brake drum has a surface of phenol formaldehyde resin.

3. A seat having a back tiltable to swing upwardly and forwardly and having a pin projecting from said back to swing with said back in an arc transverse to the length of the pin, a swinging arm on said seat engaging the lower side of said pin to move said back upwardly and forwardly, spring means actuating said swinging arm, a latch pivoted on said seat, a spring pressing said latch to a position to engage said pin as said back is tilted to upright position and to oppose further forward tilting, the engaging surface of said latch being slightly inclined to the direction of movement of said pin to provide a slight component of force against said last named spring to release said latch under overriding pressure.

4. A seat comprising a base, a back pivoted to said base for forward and rearward tilting, a spring secured at one end to the seat for urging said back to forward position, a transmission from said spring to said back, said transmission comprising a lever pivoted to the seat having an arm engaged by the other end of said spring, said back having a pin projecting therefrom to be engaged by said lever in forward swinging movement of said lever to drive said back in forward swinging movement, a fixed stop on the seat to engage said lever to limit the forward swinging to a vertical position of said back, a latch pivotally mounted on said lever having a latch surface spring pressed to engage said pin against relative forward movement of said pin, said latch surface being inclined to the movement of said pin whereby movement of said pin against said surface provides a small coefficient of force opposed to the spring pressure on said latch.

5. The seat of claim 4 having a brake drum geared to be rotated by said back on tilting, a brake band fixed at one end to the seat and thence extending about said brake drum in the direction of rotation of said drum as said back is tilted backwardly and resilient means to hold the free end of said brake band in contact with said drum.

References Cited in the file of this patent

UNITED STATES PATENTS

| | | |
|---|---|---|
| 364,053 | Skau | May 31, 1887 |
| 642,010 | Seng | Jan. 23, 1900 |
| 1,189,995 | Olson | July 4, 1916 |
| 1,320,014 | Lenard | Oct. 28, 1919 |
| 1,701,604 | Boery | Feb. 12, 1929 |
| 1,773,597 | Myerson | Aug. 19, 1930 |
| 1,803,835 | Bell | May 5, 1931 |
| 2,114,121 | Bender | Apr. 12, 1938 |